United States Patent
Mandapaka et al.

(10) Patent No.: US 9,137,728 B2
(45) Date of Patent: Sep. 15, 2015

(54) METHOD OF PREDICTING SUITABLE CANDIDATES FOR USER EQUIPMENT CELL RESELECTION IN MOBILE NETWORKS BASED ON THE DIRECTION OF MOVEMENT

(71) Applicant: QUALCOMM Incorporated, San Diego, CA (US)

(72) Inventors: Aditya S. Mandapaka, San Diego, CA (US); Tom Chin, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 233 days.

(21) Appl. No.: 13/759,719

(22) Filed: Feb. 5, 2013

(65) Prior Publication Data
US 2014/0220984 A1    Aug. 7, 2014

(51) Int. Cl.
H04W 36/32 (2009.01)
H04W 36/24 (2009.01)
H04W 48/20 (2009.01)

(52) U.S. Cl.
CPC ............ *H04W 36/32* (2013.01); *H04W 36/245* (2013.01); *H04W 48/20* (2013.01)

(58) Field of Classification Search
CPC . H04W 36/32; H04W 36/0061; H04W 24/00; H04W 24/10; H04W 88/02; H04W 64/006; H04W 48/20; H04W 40/248; H04W 16/28; H04W 72/046; H04W 12/06; H04W 48/02; H04W 4/046; H04W 4/206; H04W 84/005; H04W 4/02; H04W 64/00; G08G 1/0965; G08G 1/096775; G08G 1/166; G08G 1/096725; G08G 5/025; G08G 1/0212; G08G 1/0684; G06Q 30/0265; G07C 5/008; G01S 17/936; H04L 63/08; H04N 21/214

USPC ........... 455/434, 437, 440, 441; 370/255, 332
See application file for complete search history.

(56) References Cited

U.S. PATENT DOCUMENTS

| | | | |
|---|---|---|---|
| 2004/0243298 A1 | 12/2004 | Knuuttila et al. | |
| 2008/0108353 A1* | 5/2008 | Lee et al. | ...................... 455/437 |
| 2009/0124258 A1 | 5/2009 | Jeon | |
| 2010/0113019 A1 | 5/2010 | Jeong et al. | |
| 2010/0184439 A1 | 7/2010 | Chen et al. | |
| 2011/0143761 A1 | 6/2011 | Uusitalo et al. | |
| 2012/0155330 A1* | 6/2012 | Hammons, Jr. | ............... 370/255 |
| 2012/0195290 A1 | 8/2012 | Bienas et al. | |
| 2012/0208536 A1 | 8/2012 | Cha et al. | |
| 2012/0329463 A1 | 12/2012 | Tajima et al. | |

OTHER PUBLICATIONS

International Search Report and Written Opinion—PCT/US2014/013176—ISA/EPO—Jun. 13, 2014.

* cited by examiner

*Primary Examiner* — Nizar Sivji
(74) *Attorney, Agent, or Firm* — Kilpatrick Townsend & Stockton LLP

(57) ABSTRACT

Methods and apparatuses for predicting candidates for cell reselection are presented. In some embodiments, such a method may include determining, by a mobile device, a current direction of motion of the mobile device; determining, by the mobile device, based on network topology information, that at least two cells of a plurality of cells are located in the current direction of motion of the mobile device; prioritizing, by the mobile device, the at least two cells of the plurality of cells for reselection; measuring, by the mobile device, signal properties of the at least two prioritized cells based on the prioritizing; and selecting, by the mobile device, a first cell of the at least two prioritized cells for reselection, based on: a location of the first cell and the signal properties of the first cell.

32 Claims, 3 Drawing Sheets

METHOD OF PREDICTING SUITABLE CANDIDATES FOR USER EQUIPMENT CELL RESELECTION IN MOBILE NETWORKS BASED ON THE DIRECTION OF MOVEMENT

BACKGROUND

Modern mobile devices provide wireless network connectivity to one or more networks. Due to the limitation in range of network base stations, as the user moves the mobile device changes between various serving base stations. In some situations, a mobile device may be used in an environment in which it is traveling at a high speed, such as when the user is traveling on a high-speed train or in a fast-moving car. As a result of the movement cell reselections and handoffs may occur frequently, and the signal strength measurements that are performed by the mobile device before each of the reselections and handoffs may result in spotty coverage or otherwise degraded performance. Thus, there is a need for predictive cell reselection.

BRIEF SUMMARY

Certain embodiments are described that provide a method for predicting suitable candidates for cell reselection in mobile networks based on the direction of movement. In some embodiments, such a method may comprise determining, by a mobile device, a current direction of motion of the mobile device; determining, by the mobile device, based on network topology information, that at least two cells of a plurality of cells are located in the current direction of motion of the mobile device; prioritizing, by the mobile device, the at least two cells of the plurality of cells for reselection; measuring, by the mobile device, signal properties of the at least two prioritized cells based on the prioritizing; and selecting, by the mobile device, a first cell of the at least two prioritized cells for reselection, based on: the first cell being located in the current direction of motion of the mobile device; having measured signal properties that meet or exceed a predetermined threshold; and being closer in distance to the mobile device than one or more other cells of the at least two prioritized cells.

BRIEF DESCRIPTION OF THE DRAWINGS

Aspects of the disclosure are illustrated by way of example. In the accompanying figures, like reference numbers indicate similar elements, and.

DETAILED DESCRIPTION

Figure 1:
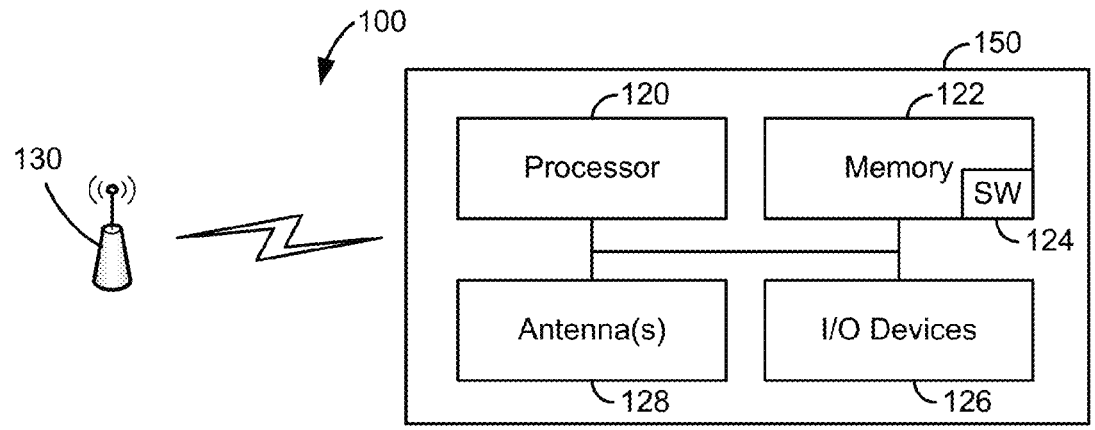
FIG. 1 illustrates a simplified diagram of a system 100 that may incorporate one or more embodiments.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

In some situations, a mobile device may be used in an environment in which it is traveling at a high speed, such as when the user who is traveling at a high speed. For example, a user may be traveling in a high-speed train, a fast-moving car, or where possible, in an airplane. Due to the user's speed, the device frequently changes the base station to which it is connected. For example, because the user rapidly moves into, and then out of range of various base stations. This high frequency base station, or cell tower, reselections and handoff may result in weak or degraded network performance.

In some conventional systems, a base station, such as a cellular network tower, may provide network topology information that specifies the frequencies and/or other properties of neighbor base stations. This information may be provided to various devices, using various devices connected to that base station using signaling messages and/or other broadcast messages that specifies the frequencies and/or other properties of neighbor cells. Such information may, for instance, be provided in relation to a reference cell that is currently selected by a particular mobile device.

In some conventional systems, the mobile device is configured to evaluate the signal strength and/or other properties of one or more of the neighbor base station(s). In some embodiments, the mobile device will select a particular base station based on signal strength or other properties of the particular base station. For example, the mobile device may determine how the properties of various base stations satisfy one or more reselection criteria.

In some embodiments, when a mobile device is traveling at a relatively high speed this conventional approach to reselection may be inefficient, ineffective, and inconvenient. For example, the high speed of the mobile device may mean that the signal strength measurement or other factors may change so rapidly that by the time the mobile device has connected to a new base station, the signal from that base station is no longer strong.

As discussed below, some embodiments of the present disclosure provide more efficient, effective, and convenient techniques for base station reselection. Some embodiments provide for systems and methods that allow a mobile device to select a new base station based on the current direction of motion of the mobile device.

In some embodiments of the present disclosure, a mobile device or other user equipment (UE) may prioritize a certain base station, or "cell" of the mobile network for reselection, based on the direction of motion in which the mobile device may be traveling. For example, a mobile device initially may determine a current direction of motion in which it is traveling. Subsequently, the mobile device may prioritize a first cell of a plurality of cells for reselection, based on the direction of motion and network topology information. The first cell may, for instance, be located in the determined direction of motion, and may be prioritized over one or more other neighbor cells included in the plurality of cells that are not located in the direction of motion.

Furthermore, in some embodiments the cell may be configured to provide the UE with network topology information associated with other cells in the area. In other arrangements, however, the network topology information may be obtained from an external source, such as an online database in which network topology information is stored and/or maintained.

In some embodiments, the UE may use this network topology to determine the priority of these various cells. For example, in some embodiments of the present disclosure, the UE may determine the priority of a cell not based on the current strength of the signal that may be received from that cell, but instead on the cell's location in or around the UE's current path. Thus, though the selected cell does not currently provide the strongest signal, as the user moves closer to the selected cell, the signal strength will improve. Thus, in some embodiments of the present disclosure, predictive cell selection increases signal strength and reduces the rate at which UE changes providing cells.

In some embodiments, network topology information may be provided relative to a reference cell that is included in one of a plurality of cells. In some embodiments, the reference cell may, for instance, be the currently selected serving cell for the mobile device. In addition, the network topology information may include broadcast information for the neighbor cells, position information for the neighbor cells, and position information for the reference cell. In some embodiments, the broadcast information for the neighbor cells may, for instance, include frequencies for the neighbor cells (e.g., the frequencies at which the neighbor cells transmit and/or receive various signals). Further, in some embodiments, the position information for the neighbor cells may, for instance, include degree of latitude information, degree of longitude information, relative north information, and relative east information. In some embodiments, such position information may be obtained from Information Elements (IE) that are included in System Information Blocks (SIBs) provided by a currently selected serving cell.

Further, in some embodiments, prioritizing cells for reselection may include calculating relative priority values for at least two neighbor cells included in the plurality of cells. The at least two neighbor cells may, for instance, both be located in the current direction of motion of the mobile device, and the relative priority values may be calculated based on the respective distances between each of the neighbor cells and the mobile device.

Turning now the Figures, FIG. 1 illustrates a simplified diagram of a system 100 that may incorporate one or more embodiments. As shown in FIG. 1, system 100, which comprises a wireless access point 130 and UE 150, which may be for example a mobile device such as a smartphone, tablet, handheld computer, laptop computer, or other portable computing device. In the embodiment shown in FIG. 1, UE 150 comprises a processor 120, memory 122 including software 124, input/output (I/O) device(s) 126 (e.g., a display, speaker, keypad, touch screen or touchpad, etc.), and one or more antennas 128.

The antenna(s) 128 provide communication functionality for the UE 150 and facilitate bi-directional communication with transmission networks, for example, cellular, data, or SPS networks. The processor 120 is an intelligent hardware device, e.g., a central processing unit (CPU) such as those made by Intel® Corporation or AMD®, a microcontroller, an application specific integrated circuit (ASIC), etc. The memory 122 includes non-transitory storage media such as random access memory (RAM) and read-only memory (ROM). The memory 122 stores the software 124 which is computer-readable, computer-executable software code containing instructions that are configured to, when executed, cause the processor 120 to perform various functions described herein. Alternatively, the software 124 may not be directly executable by the processor 120 but is configured to cause the computer, e.g., when compiled and executed, to perform the functions. In other embodiments, not shown in FIG. 1, UE 150 may comprise additional components, such as motion detectors or accelerometers that processor 120 may use to determine movement of device 100.

Further, wireless access point 130 may comprise one or more wireless access points, referred to in this application as base stations or cells. Wireless access point 130 may comprise a transmitter/receiver configured to communicate signals to and from antenna 128. Further, in some embodiments, wireless access point 130 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc.

In some embodiments, each of the one or more wireless access points 130 can provide communication coverage for a respective geographic area. In some embodiments, the wireless access points 130 may comprise various ranges and signal strengths, e.g., macro, pico, and/or femto base stations, etc. A macro base station may cover a relatively large geographic area (e.g., several kilometers in radius) and may allow unrestricted access by terminals with service subscription. A pico base station may cover a relatively small geographic area (e.g., a pico cell) and may allow unrestricted access by terminals with service subscription. A femto or home base station may cover a relatively small geographic area (e.g., a femto cell) and may allow restricted access by terminals having association with the femto cell (e.g., terminals for users in a home).

Figure 2:
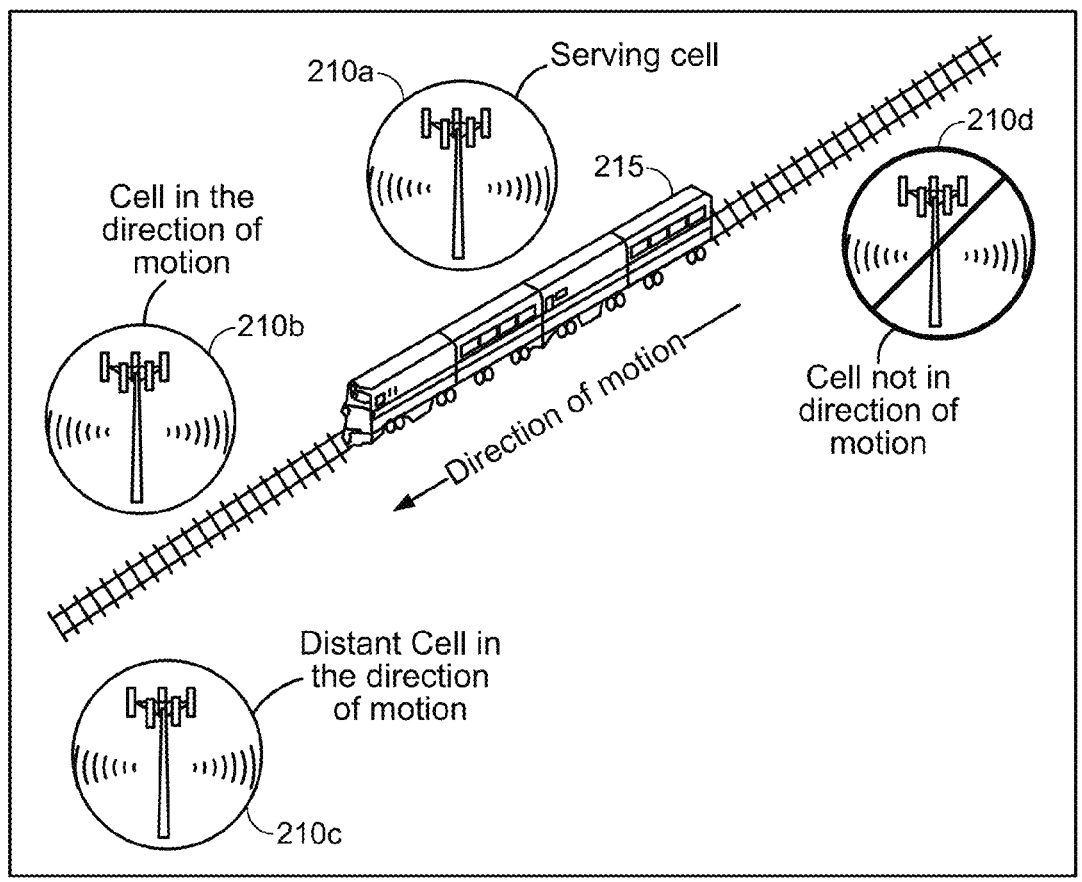
FIG. 2 illustrates an example operating environment in which some embodiments may be implemented.

FIG. 2 illustrates an example operating environment in which some embodiments may be implemented. In particular, as seen in FIG. 2, one or more cells 210a, 210b, 210c, and 210d. In some embodiments, these cells may comprise a wireless access point 130 described above with regard to FIG. 1. Furthermore, as shown in FIG. 2, a user may be attempting to use UE while traveling on train 215 in a direction of motion.

In the embodiment shown in FIG. 2, the UE may be connected to cell 210a, but at the same time, still be in range of cells 210b, 210c, and 210d. But as can be seen, only cells 201b and 210c are in the direction of motion of the UE. Thus, in some embodiments, of the present disclosure the one or more cells in direction of motion may be prioritized for reselection. Further, in some embodiments, the cells in the direction of motion may be ranked based on their proximity to the current location of the mobile device. In addition, cells not in the direction of motion of the mobile device (e.g., cell 210d, which has already been passed by the mobile device in FIG. 2) may be disregarded, or de-prioritized, for purposes of reselection.

Figure 3:
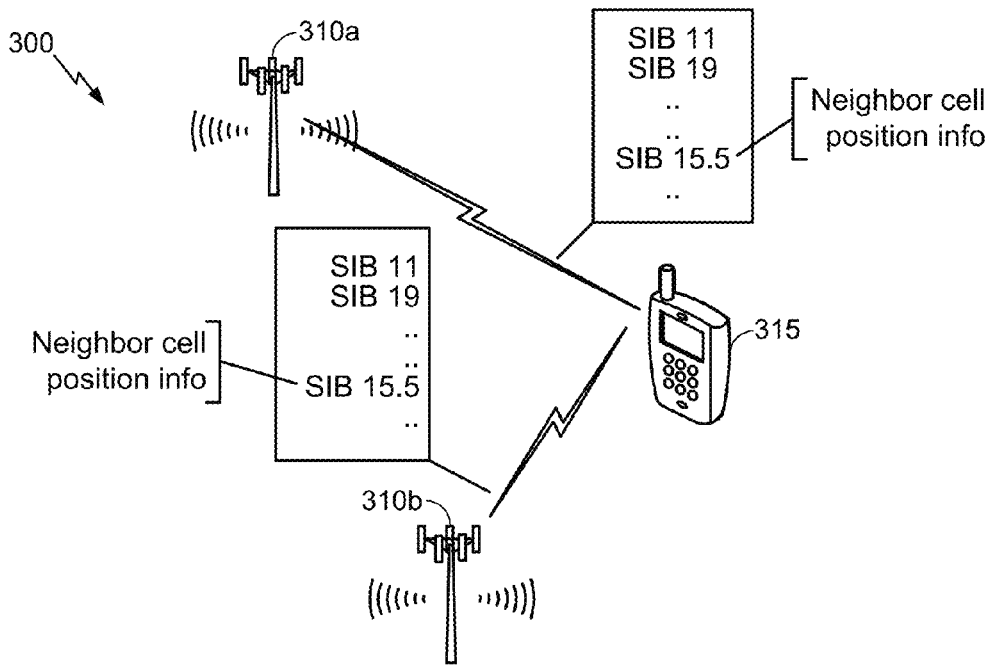
FIG. 3 illustrates an example operating environment in which some embodiments may be implemented.

FIG. 3. illustrates an example operating environment in which some embodiments may be implemented. As shown in FIG. 3, two example cells 310a and 310b transmit signals to UE 315. In some embodiments, these cells may comprise a wireless access point 130 described above with regard to FIG. 1. Furthermore, UE 315 may comprise an embodiment of UE 150 described above with regard to FIG. 1.

As shown in FIG. 3, in some embodiments 310a and 310b transmit signals comprising network topology information associated with their neighboring cells. In some embodiments, the UE 315 may be connected to only one of cells 310a and 310b. In such an embodiment, this cell may be the serving or reference cell. In such an embodiment, the network topology information may include broadcast information for the neighbor cells, position information for the neighbor cells, and position information for the reference cell. For example, in one embodiment, UE 315 may be connected to cell 310a, and in such an embodiment, cell 310a may send network topology information associated with cell 315a.

In some embodiments, the broadcast information for the neighbor cells may, for instance, include frequencies for the neighbor cells (e.g., the frequencies at which the neighbor cells transmit and/or receive various signals). Further, in some embodiments, the position information for the neighbor cells may, for instance, include degree of latitude information, degree of longitude information, relative north information, and relative east information. In some embodiments, such position information may be obtained from Information Elements that are included in System Information Blocks (SIBs) provided by a currently selected serving cell. For example, as shown in FIG. 3, both of cells 310a and 310b are transmitting SIBs associated with their neighboring cells.

In other embodiments, the network topology information may be obtained from an external source, such as an online database in which network topology information is stored and/or maintained. For example, in some embodiments, this database may comprise a remote database. In other embodiments, this database may be stored on a local data store on the UE, for example, on memory 122 described above with regard to FIG. 1.

Figure 4:
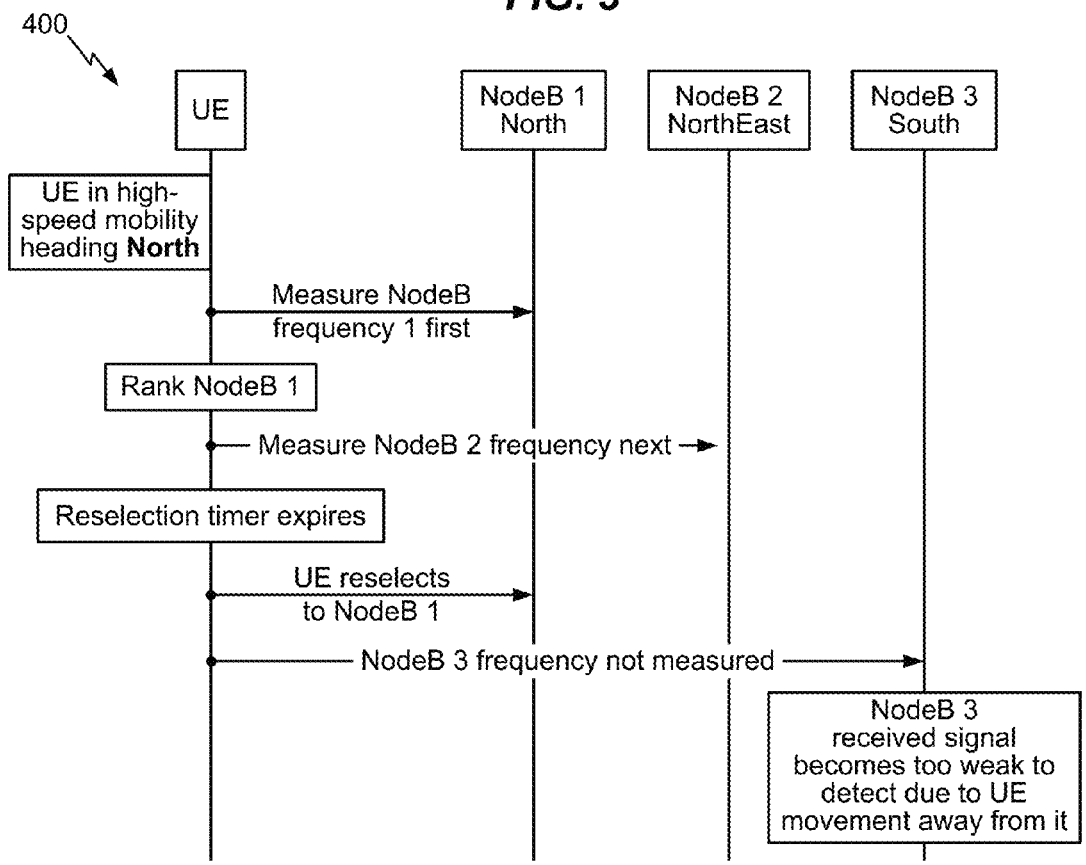
FIG. 4 illustrates a sequence chart that depicts an example of cell reselection according to one or more embodiments.

FIG. 4 illustrates a sequence chart that depicts an example of cell reselection according to one or more embodiments. In particular, as seen in FIG. 4, one or more cells that are in the current direction of motion of a mobile device (e.g., NodeB-1 and NodeB-2) may be prioritized for reselection over one or more cells that are not in the current direction of motion of the mobile device (e.g., NodeB-3). In addition, as between the two cells that are in the current direction of motion of the mobile device, the cells may be ranked for reselection based on the current direction of motion of the mobile device and/or based on their respective proximity to the mobile device.

Once these neighbor cells have been prioritized and ranked, the mobile device may perform signal strength measurements and/or otherwise evaluate cell reselection criteria for each of the neighbor cells, in an order defined by the prioritization and ranking. In particular, the mobile device may obtain signal strength measurements with respect to the highest-ranked prioritized cell (e.g., NodeB-1) first for purposes of cell reselection. In addition, the mobile device may initiate a reselection timer for this cell upon obtaining these signal measurements. Thereafter, the mobile device may obtain signal strength measurements with respect to the next highest-ranked cell that is in the direction of motion of the mobile device (e.g., NodeB-2) for purposes of cell reselection. Upon expiration of the reselection timer, the neighbor cell for which the reselection timer was established may be selected by the mobile device (e.g., based on this cell's satisfaction of the reselection criteria).

As shown in FIG. 4, by prioritizing cells in this way, a mobile device may reselect a new cell before even measuring signal strength properties of the neighbor cell that is not located in the direction of motion of the mobile device. Advantageously, this technique may result in faster reselection, as well as better performance and more continuous service to the mobile device.

Figure 5:
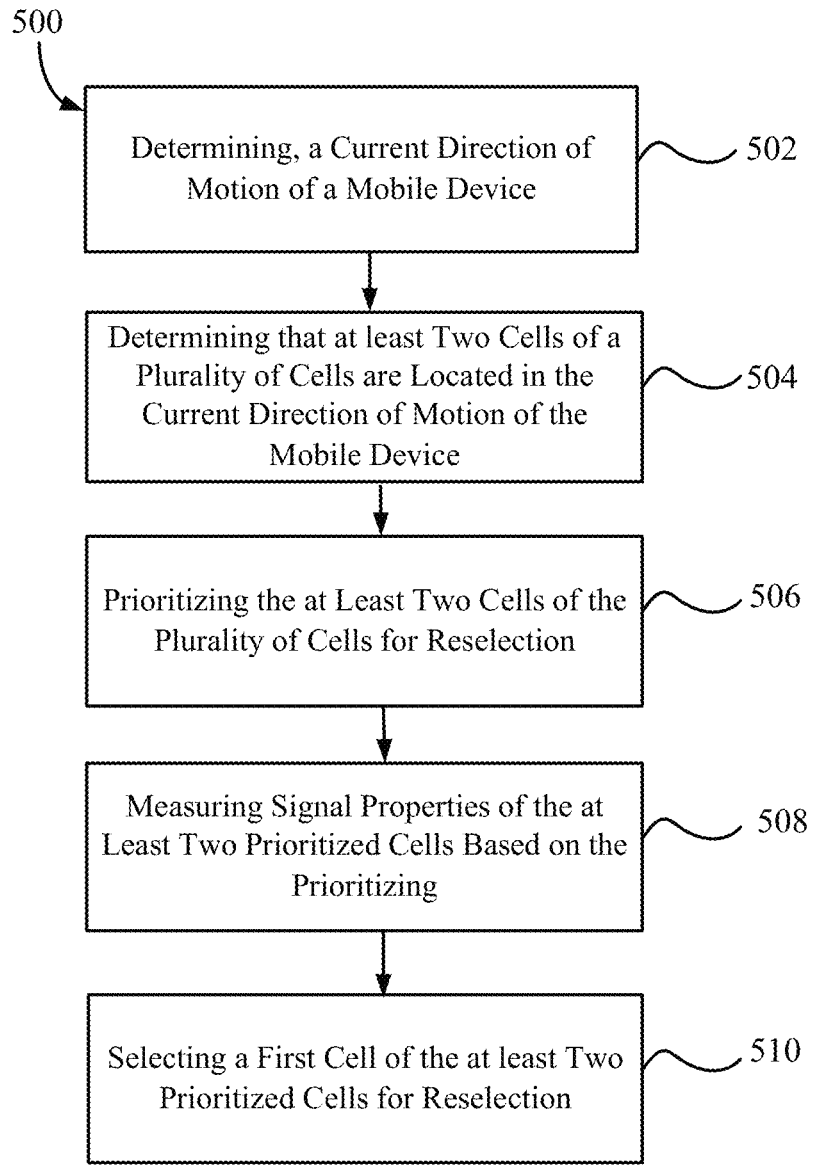
FIG. 5 illustrates flow chart of the stages of a method for predicting suitable candidates for cell reselection in mobile networks based on the direction of movement.

FIG. 5 is a flow chart of the stages of a method for prediction suitable candidates for cell reselection in mobile networks based on the direction of movement. In some embodiments, the stages in FIG. 5 may be implemented in program code that is executed by a processor, for example, the processor in a general purpose computer or server. In some embodiments, these stages may be implemented by a group of processors. The stages shown in FIG. 5 are described with regard to the components of system 100 shown in FIG. 1.

The method 500 begins at stage 502 when processor 120 determines a current direction of motion of a mobile device. In some embodiments, the direction of motion can be achieved either by using inputs from positional and directional components in the mobile device or by other means such as extrapolations based on cell-reselection history, an internal sensor, or signals receive from a SPS system.

Next, at stage 504, the processor 120 determines that at least two cells of a plurality of cells are located in the current direction of motion of the mobile device. In some embodiments, this may comprise receiving network topology information from the current cell or another cell. In other embodiments, this may comprise receiving network topology information from a database, for example, a remote database or a database internal to the mobile device. For example, in some embodiments, a device may receive information comprising for each neighbor cell a "Degree of Latitude" and "Degree of Longitude" or "Relative North" and "Relative East" to the reference cell. In still other embodiments, this may comprise performing extrapolation based on signals received from each of the plurality of cells.

Next, at step 506, processor 120 may prioritize the at least two cells of the plurality of cells for reselection. In some embodiments, this prioritization may comprise calculations associated with each cell's location, as well as each cell's location along the user's current path of motion. For example, in some embodiments, a cell that is along a user's current path may comprise a higher priority than a cell that is closer to the user's current location. Further, in such an embodiment, a cell on the user's path of motion, but behind the user (i.e. a cell that the user has already passed) may have a still lower priority.

Next, at step 508, the processor 120 measures signal properties of the at least two prioritized cells based on the prioritizing 508. In some embodiments, these signal properties may comprise one or more of the type of signal, the signal provider, the strength of the signal, the signal to noise ratio (SNR), the frequency, or some other factor commonly associated with signals.

Then at step 510, the processor 120 selects a first cell of the at least two prioritized cells for reselection. In some embodiments, the selected cell may comprise the cell with the highest priority and strongest signal strength. In other embodiments, the selected cell may comprise a cell with the highest priority, but not the highest signal strength or quality. For example, in such an embodiment, a cell may be selected because its priority indicates that it is along the user's current path of motion, and thus will have a signal that gets stronger as the user approaches.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A method comprising:
   determining, by a mobile device, a current direction of motion of the mobile device;
   determining, by the mobile device, based on network topology information, that at least two cells of a plurality of cells are located in the current direction of motion of the mobile device;
   prioritizing, by the mobile device, the at least two cells of the plurality of cells for reselection, wherein the prioritizing is based in part on a location of each of the at least two cells with respect to the current direction of motion;
   measuring, by the mobile device, signal properties of the at least two prioritized cells based on the prioritizing;
   selecting, by the mobile device, a first cell of the at least two prioritized cells for reselection, based on: a location of the first cell and the signal properties of the first cell,
   wherein the first cell has signal properties that meet or exceed a predetermined threshold;
   wherein the first cell is closer in distance to the mobile device than one or more other cells of the at least two prioritized cells;
   wherein the network topology information is provided relative to a reference cell included in the plurality of cells; and
   wherein the network topology information includes broadcast information for one or more neighbor cells, position information for the neighbor cells, and position information for the reference cell.

2. The method of claim 1,
   wherein the first cell is located in the current direction of motion, and
   wherein the first cell is prioritized over at least one cell included in the plurality of cells that is not located in the current direction of motion.

3. The method of claim 1, wherein the network topology information is obtained from a network element associated with the plurality of cells.

4. The method of claim 1, wherein the broadcast information includes frequencies for the neighbor cells.

5. The method of claim 1, wherein the position information for the neighbor cells includes degree of latitude information, degree of longitude information, relative north information, and relative east information.

6. The method of claim 1, wherein prioritizing the first cell of the plurality of cells for reselection includes calculating relative priority values for at least two neighbor cells included in the plurality of cells, the at least two neighbor cells being located in the current direction of motion.

7. The method of claim 1, wherein the network topology information is obtained from a reliable source.

8. The method of claim 7, wherein the reliable source includes a third-party online database of cell locations.

9. A mobile device comprising:
   an antennae configured to receive signals from a plurality of cells;
   a processor configured to:
   determine a current direction of motion of the mobile device;
   determine based on network topology information, that at least two cells of the plurality of cells are located in the current direction of motion of the mobile device;
   prioritize the at least two cells of the plurality of cells for reselection, wherein the prioritizing is based in part on a location of each of the at least two cells with respect to the current direction of motion;
   measure the signal properties of the at least two prioritized cells based on the prioritizing;
   select a first cell of the at least two prioritized cells for reselection, based on: a location of the first cell and the signal properties of the first cell, wherein the first cell has signal properties that meet or exceed a predetermined threshold;
   wherein the first cell is closer in distance to the mobile device than one or more other cells of the at least two prioritized cells;
   wherein the network topology information is provided relative to a reference cell included in the plurality of cells; and wherein the network topology information includes broadcast information for one or more neighbor cells, position information for the neighbor cells, and position information for the reference cell.

10. The mobile device of claim 9,
wherein the first cell is located in the current direction of motion, and
wherein the first cell is prioritized over at least one cell included in the plurality of cells that is not located in the current direction of motion.

11. The mobile device of claim 9, wherein the network topology information is obtained from a network element associated with the plurality of cells.

12. The mobile device of claim 9, wherein the broadcast information includes frequencies for the neighbor cells.

13. The mobile device of claim 9, wherein the position information for the neighbor cells includes degree of latitude information, degree of longitude information, relative north information, and relative east information.

14. The mobile device of claim 9, wherein prioritizing the first cell of the plurality of cells for reselection includes calculating relative priority values for at least two neighbor cells included in the plurality of cells, the at least two neighbor cells being located in the current direction of motion.

15. The mobile device of claim 9, wherein the network topology information is obtained from a reliable source.

16. The mobile device of claim 15, wherein the reliable source includes a third-party online database of cell locations.

17. A non-transitory computer readable medium comprising program code, which when executed by the processor, causes the processor to:
determine a current direction of motion of a mobile device;
determine based on network topology information, that at least two cells of the plurality of cells are located in the current direction of motion of the mobile device;
prioritize the at least two cells of the plurality of cells for reselection, wherein the prioritizing is based in part on a location of each of the at least two cells with respect to the current direction of motion;
measure the signal properties of the at least two prioritized cells based on the prioritizing;
select a first cell of the at least two prioritized cells for reselection, based on: a location of the first cell and the signal properties of the first cell, wherein the first cell has signal properties that meet or exceed a predetermined threshold;
wherein the first cell is closer in distance to the mobile device than one or more other cells of the at least two prioritized cells;
wherein the network topology information is provided relative to a reference cell included in the plurality of cells; and
wherein the network topology information includes broadcast information for one or more neighbor cells, position information for the neighbor cells, and position information for the reference cell.

18. The non-transitory computer readable medium of claim 17,
wherein the first cell is located in the current direction of motion, and
wherein the first cell is prioritized over at least one cell included in the plurality of cells that is not located in the current direction of motion.

19. The non-transitory computer readable medium of claim 17, wherein the network topology information is obtained from a network element associated with the plurality of cells.

20. The non-transitory computer readable medium of claim 17, wherein the broadcast information includes frequencies for the neighbor cells.

21. The non-transitory computer readable medium of claim 17, wherein the position information for the neighbor cells includes degree of latitude information, degree of longitude information, relative north information, and relative east information.

22. The non-transitory computer readable medium of claim 17, wherein prioritizing the first cell of the plurality of cells for reselection includes calculating relative priority values for at least two neighbor cells included in the plurality of cells, the at least two neighbor cells being located in the current direction of motion.

23. The non-transitory computer readable medium of claim 17, wherein the network topology information is obtained from a reliable source.

24. The non-transitory computer readable medium of claim 23, wherein the reliable source includes a third-party online database of cell locations.

25. An apparatus comprising:
means for receiving signals from a plurality of cells;
a processor configured to determine a current direction of motion of the mobile device;
means for determining based on network topology information, that at least two cells of the plurality of cells are located in the current direction of motion of the mobile device;
means for prioritizing the at least two cells of the plurality of cells for reselection, wherein the prioritizing is based in part on a location of each of the at least two cells with respect to the current direction of motion;
means for measuring the signal properties of the at least two prioritized cells based on the prioritizing;
means for selecting a first cell of the at least two prioritized cells for reselection, based on a location of the first cell and the signal properties of the first cell, wherein the first cell has signal properties that meet or exceed a predetermined threshold;
wherein the first cell is closer in distance to the mobile device than one or more other cells of the at least two prioritized cells;
wherein the network topology information is provided relative to a reference cell included in the plurality of cells; and
wherein the network topology information includes broadcast information for one or more neighbor cells, position information for the neighbor cells, and position information for the reference cell.

26. The apparatus of claim 25,
wherein the first cell is located in the current direction of motion, and
wherein the first cell is prioritized over at least one cell included in the plurality of cells that is not located in the current direction of motion.

27. The apparatus of claim 25, wherein the network topology information is obtained from a network element associated with the plurality of cells.

28. The apparatus of claim 25, wherein the broadcast information includes frequencies for the neighbor cells.

29. The apparatus of claim 25, wherein the position information for the neighbor cells includes degree of latitude information, degree of longitude information, relative north information, and relative east information.

30. The apparatus of claim 25, wherein prioritizing the first cell of the plurality of cells for reselection includes calculating relative priority values for at least two neighbor cells included in the plurality of cells, the at least two neighbor cells being located in the current direction of motion.

31. The apparatus of claim 25, wherein the network topology information is obtained from a reliable source.

32. The apparatus of claim 31, wherein the reliable source includes a third-party online database of cell locations.

* * * * *